(12) United States Patent
Raiser

(10) Patent No.: US 8,343,650 B2
(45) Date of Patent: Jan. 1, 2013

(54) MODULAR PLATE CARRIER CONCEPT FOR MOUNTING AND EMBEDDED COOLING OF POUCH CELL BATTERY ASSEMBLIES

(75) Inventor: Stephen Raiser, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 343 days.

(21) Appl. No.: 12/854,740

(22) Filed: Aug. 11, 2010

(65) Prior Publication Data

US 2012/0040225 A1 Feb. 16, 2012

(51) Int. Cl.
*H01M 10/50* (2006.01)

(52) U.S. Cl. .................. 429/120; 429/151; 429/154

(58) Field of Classification Search .............. 429/120, 429/151, 152, 153, 154
See application file for complete search history.

(56) References Cited

U.S. PATENT DOCUMENTS

| | | | |
|---|---|---|---|
| 507,139 A * | 10/1893 | Kennedy ................. | 429/154 |
| 4,125,680 A * | 11/1978 | Shropshire et al. ............ | 429/4 |
| 4,353,969 A * | 10/1982 | Rippel et al. ................. | 429/144 |
| 4,927,717 A * | 5/1990 | Turley et al. ................. | 429/405 |
| 6,296,967 B1 | 10/2001 | Jacobs et al. | |
| 7,201,998 B2 | 4/2007 | Kim | |
| 7,993,776 B2 * | 8/2011 | Lee et al. ..................... | 429/159 |
| 2007/0184341 A1 * | 8/2007 | Yoon et al. .................. | 429/152 |
| 2009/0325059 A1 * | 12/2009 | Niedzwiecki et al. ......... | 429/152 |
| 2011/0151303 A1 * | 6/2011 | Cherng et al. ............... | 429/120 |
| 2012/0040223 A1 * | 2/2012 | Odumodu .................... | 429/120 |

* cited by examiner

*Primary Examiner* — Robert B Davis
(74) *Attorney, Agent, or Firm* — John A. Miller; Miller IP Group, PLC

(57) ABSTRACT

A modular assembly for housing battery cells. The modular assembly includes a plurality of U-shaped members having cooling fluid channels, where the U-shaped members are mounted together in a stacked manner. Each cooling fluid channel includes an inlet and outlet orifice, where the orifices in the stacked U-shaped members align with each other. The modular assembly also includes a plurality of thermally conductive carrier plates, where a battery cell is mounted to and between opposing carrier plates. Side edges of the carrier plates are mounted in opposing retention slots in opposing U-shaped members where a cooling fluid channel in the U-shaped member is provided within the retention slot so that a cooling fluid flowing through the cooling fluid channel and the U-shaped members contacts the carrier plates and draws heat therefrom.

20 Claims, 4 Drawing Sheets

MODULAR PLATE CARRIER CONCEPT FOR MOUNTING AND EMBEDDED COOLING OF POUCH CELL BATTERY ASSEMBLIES

BACKGROUND OF THE INVENTION

1. Field of the Invention

This invention relates generally to a modular assembly for packaging and cooling battery cells of a lithium battery and, more particularly, to a modular assembly for packaging and cooling battery cells of a lithium battery, where the assembly includes a plurality of plate carriers to which the pouch cells are mounted and a plurality of U-shaped members to which the plate carriers are mounted and through which a cooling fluid flows.

2. Discussion of the Related Art

Generally, a lithium battery will include one or more interconnected lithium cells with each cell usually being separately sealed. For certain applications, such as a variety of vehicle applications, including fuel cell vehicles, hybrid vehicles, and electric vehicles, a hundred or more cells may be connected in series to provide the power needed.

According to the kind of electrolyte used, lithium secondary batteries are classified as lithium ion batteries, which use a liquid electrolyte, and lithium polymer batteries, which use a polymer electrolyte. Lithium secondary batteries can be manufactured in various shapes. Representative shapes of lithium secondary batteries are a cylinder and a prism, which are quite common. More recently, a flexible pouch-type lithium polymer battery has been attracting attention because of its changeable shape, excellent safety, and lightweight structure.

The electrolyte of a lithium battery can be a solid polymer bearing a dissociable lithium salt, but frequently the electrolyte is a liquid in which a lithium salt has been dissolved. The liquid commonly impregnates a porous polymer separator laminate which can be multilayered, or in some instances the porous separator is itself a lithium salt containing polymer laminate. The liquid in which the lithium salt is dissolved can be ethylene carbonate, propylene carbonate or other alkyl radical bearing carbonates, or a similar organic compound, which has a boiling point above 50° C. and relatively low vapor pressure at room temperature. The electrolyte layer is located between the electrodes. Laminar lithium batteries are constructed of at least three layers, and the layered construction together with current carriers, are wrapped in a pliable polymer laminate container which thus forms a pouch.

One manner of sealing a lithium cell is to encase the cell in a plastic laminate covered foil pouch, where the foil is usually aluminum. The cell has a positive electrode, a negative electrode, an electrolyte and positive and negative current collectors or leads enclosed in a foil pouch. The current collectors provide electrical communication between the positive and negative electrodes and an outside of the pouch.

The foil pouch has an inner face coated with a polymer laminate to both protect the foil from the electrolyte and to prevent short circuiting between the positive electrode and negative electrode and the leads. Preferably the foil pouch is also coated on its outer face with a polymer laminate.

For obvious reasons lithium batteries are sensitive to moisture and atmospheric corrosion. Therefore, the polymer pouches are sealed, usually by applying pressure and heat around the edges of the polymer laminate. Heat sealing a polymer laminate to another polymer laminate usually provides a satisfactory bond; however, the metallic leads or current collectors exiting in between the polymer layers may provide incomplete sealing, possibly resulting in seepage of the electrolyte liquid in spite of all efforts to achieve a fast seal.

Although sealed pouch cells have numerous advantages associated with their construction and relatively thin profile, they are more easily damaged than cells encased in a more rigid enclosure. Thus, there is a need in the art to provide mechanical stability to the pouch cells. However, such mechanical stability should be done in such a way so as to minimize the amount of space and materials required, as well as provide a cooling function for each individual pouch.

SUMMARY OF THE INVENTION

In accordance with the teachings of the present invention, a modular assembly for housing battery cells is disclosed. The modular assembly includes a plurality of U-shaped members having cooling fluid channels, where the U-shaped members are mounted together in a stacked manner. Each cooling fluid channel includes an inlet and outlet orifice, where the orifices in the stacked U-shaped members align with each other. The modular assembly also includes a plurality of thermally conductive carrier plates, where a battery cell is mounted to and between opposing carrier plates. Side edges of the carrier plates are mounted in opposing retention slots in opposing U-shaped members where a cooling fluid channel in the U-shaped member is provided within the retention slot so that a cooling fluid flowing through the cooling fluid channel and the U-shaped members contacts the carrier plates and draws heat therefrom.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a modular assembly for packaging and cooling battery cells of a lithium battery is merely exemplary in nature, and is in no way intended to limit the invention or its applications or uses.

Figure 1:
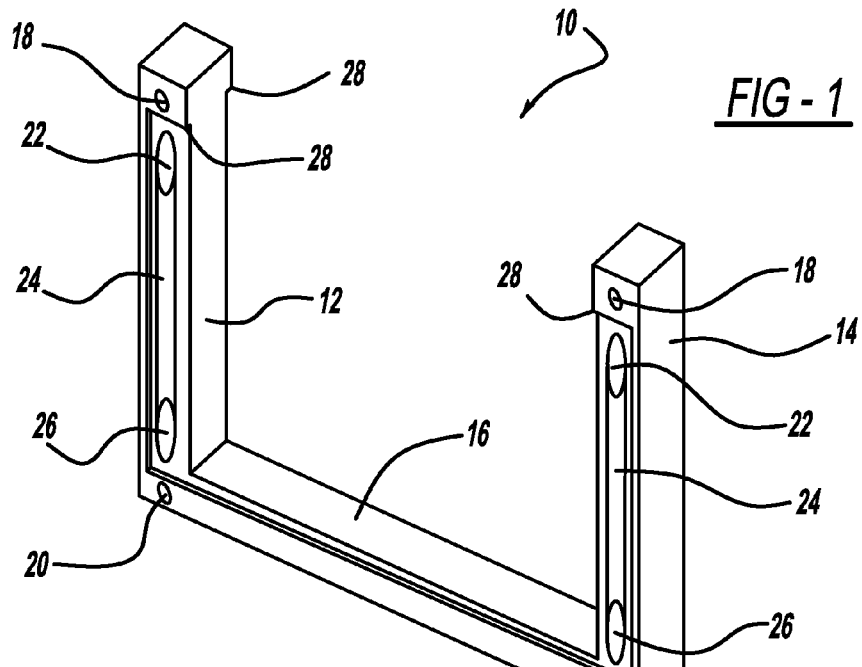
FIG. 1 is a perspective view of a U-shaped member for a modular assembly that houses battery cells.

FIG. 1 is a perspective view of a U-shaped member 10 that is part of a modular assembly for housing for a lithium battery, as will be discussed in detail below. The U-shaped member 10 includes opposing side portions 12 and 14 coupled together by a base portion 16, all having a general square or rectangular cross-sectional shape. Other embodiments can include other cross-sectional shapes for the side portions 12 and 14 and the base portion 16 within the scope of the present invention. Mounting holes 18 and 20 extend through the side portions 12 and 14 at upper and lower locations, as shown, for mounting several of the U-shaped members 10 together with bolts (not shown) or the like, as will become apparent from the discussion below. Further, the side portions 12 and 14 and the base portion 16 include a retention slot 28 formed therein at both a front and a back location that are open to an inside of the U-shaped member 10. A cooling fluid channel 24 is formed in the retention slot 28 in the side portions 12 and 14 and includes an upper orifice 22 and a lower orifice 26 that extend through the side portions 12 and 14 so as to allow a cooling fluid to flow therethrough, as will also be discussed in detail below. One of the orifices 22 or 26 will be an inlet orifice and the other of the orifices 22 or 26 will be an outlet orifice. A cooling fluid will flow through the orifices 22 and 26 and through the cooling fluid channel 24 to provide cooling for the lithium battery cells as discussed below. In one embodiment, the U-shaped member 10 is a single piece member being molded of a suitable plastic to be lightweight and inexpensive.

Figure 2:
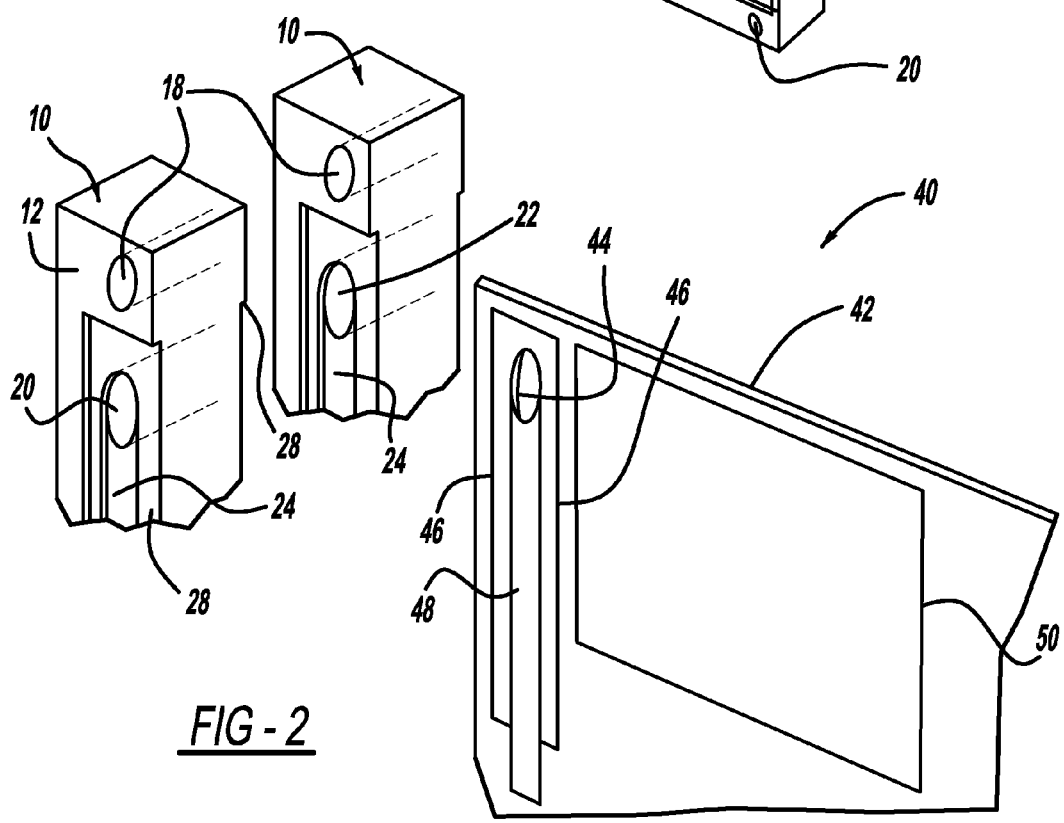
FIG. 2 is a perspective view of a portion of a modular assembly showing a carrier plate prior to insertion between two U-shaped members.

FIG. 2 is a cut-away perspective view of a portion of a modular battery assembly 40 that includes a plurality of the U-shaped members 10 depending on the number of battery cells that are to be housed in the assembly 40. The assembly 40 includes a plurality of carrier plates 42, one of which is shown in FIG. 2. The carrier plates 42 are made of a suitable thermally conductive metal, such as aluminum, so that heat generated by the battery cells is drawn away by the carrier plate 42. The carrier plate 42 include both an inlet and outlet orifice, represented as orifice 44, that align with the orifices 22 and 26. The carrier plate 42 is positioned in the retention slots 28 of opposing U-shape members 10 so that the orifices 44, 22 and 26 align in a manner that allows a cooling fluid to flow through the U-shaped members 10 and the carrier plates 42.

A suitable adhesive 46 is provided on both sides of the plate 42 adjacent to the retention slot 28, but outside of the cooling fluid channel 24, as shown, so that an area 48 on each side of the plate 42 adjacent to the cooling fluid channel 24 is free of adhesive. Thus, when the carrier plate 42 is mounted to the U-shaped members 10, cooling fluid flowing in the cooling fluid channels 24 makes direct contact with the plate 42 and is able to effectively draw heat away from the plate 42. Alternatively, an adhesive may be placed around the cooling fluid channel 24 on the U-shaped members 10, or the U-shaped members 10 may be cast directly on the carrier plate 42 so as to eliminate or reduce the need for adhesive. Further, a suitable adhesive 50 is used to attach a battery cell, such as a lithium battery pouch cell, to the plate 42 so that it is in good thermal contact therewith. Thus, heat generated by the pouch cell will be collected by the carrier plate 42 and be drawn away by the cooling fluid.

Figure 3:
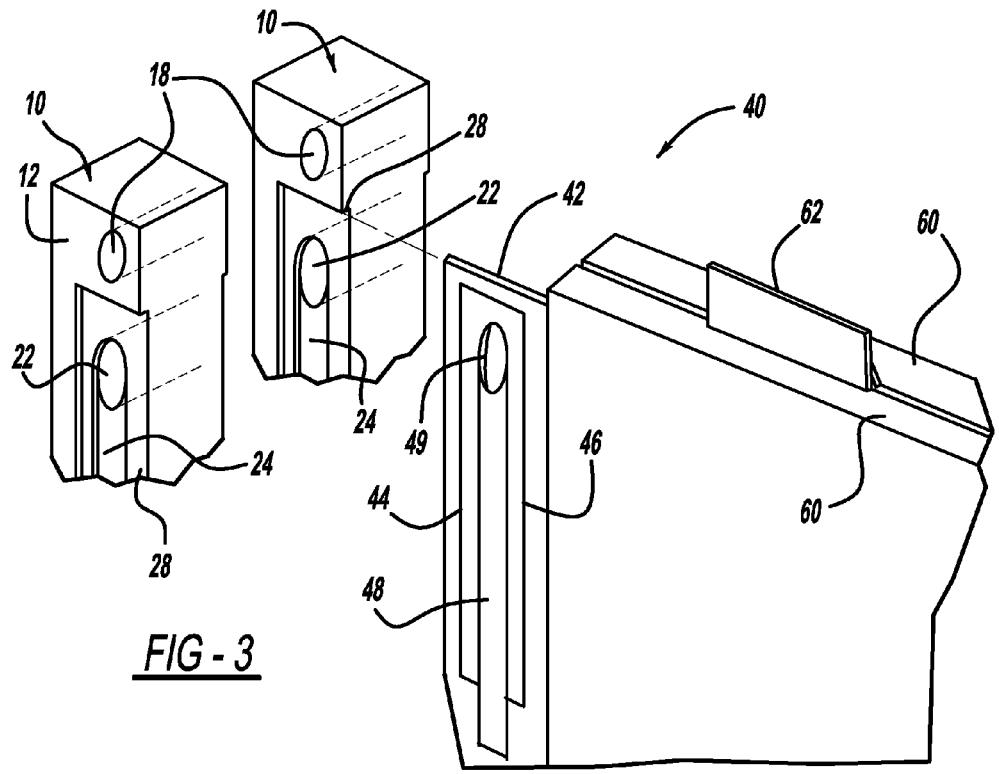
FIG. 3 is a perspective view of the modular assembly shown in FIG. 2 and including battery pouch cells.

FIG. 3 shows the modular assembly 40 as shown in FIG. 2 with lithium battery pouch cells 60 mounted on both sides of the carrier plate 42 by the adhesive 50. An electrical tab 62 provides an electrical connection to the pouch cells 60.

Figure 4:
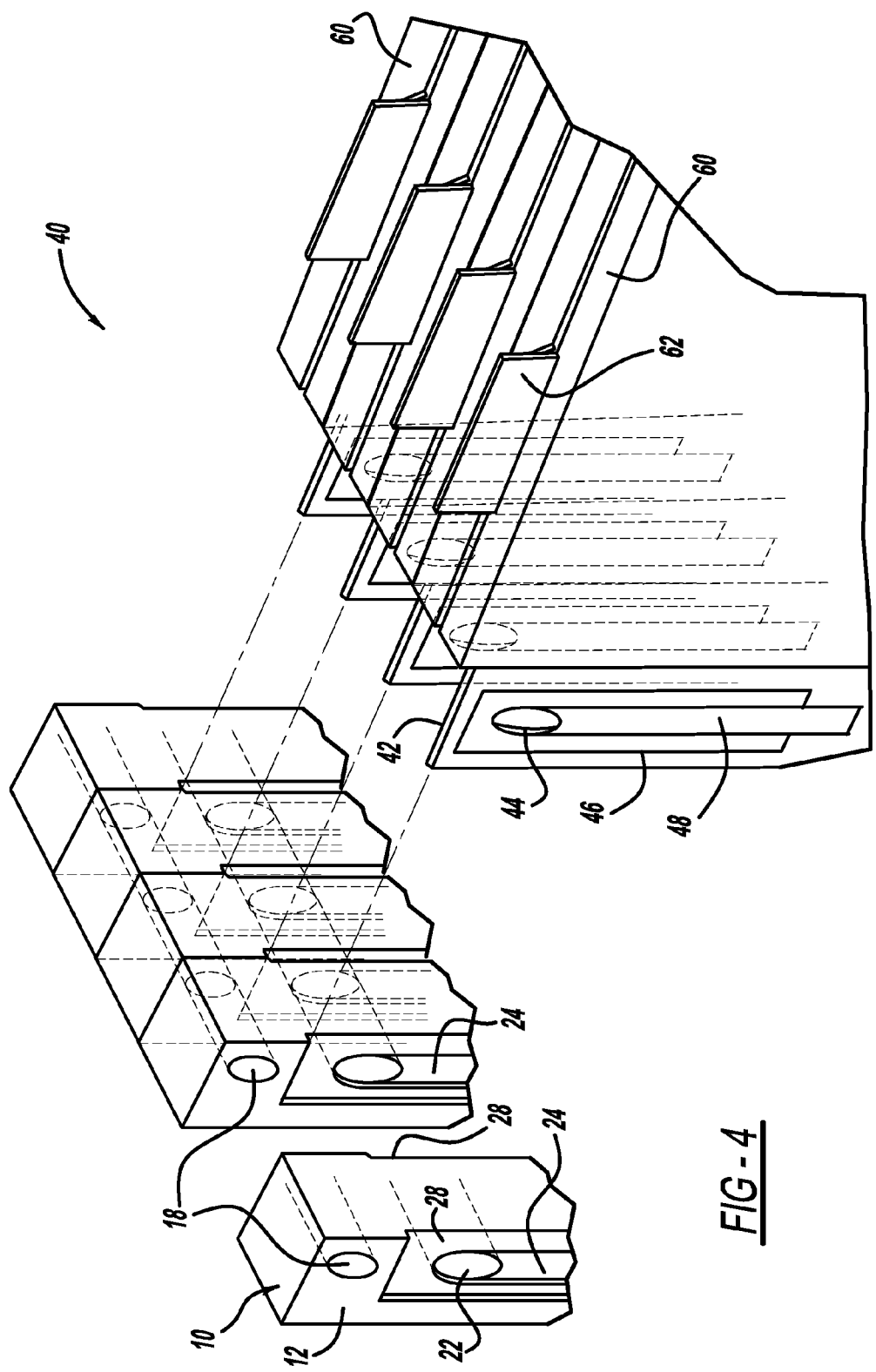
FIG. 4 is a perspective view of a portion of the modular assembly showing several carrier plates and battery cells prior to insertion between several U-shaped members.

FIG. 4 is a perspective view of the modular assembly 40 showing several of the carrier plates 42 and the pouch cells 60 prior to insertion between the U-shaped members 10. The U-shaped members 10 are packaged together so that the carrier plates 42 are positioned within the retention slots 28 of the U-shaped members 10. The modular assembly 40 created by such an arrangement allows for a cooling fluid to flow through the stacked U-shaped members 10 and cool the carrier plates 42, which in turn cools the pouch cells 60, as well as provides mechanical stability to the pouch cells 60, electrically isolates the pouch cells 60 and thermally isolates the pouch cells 60 from the ambient.

Figure 5:
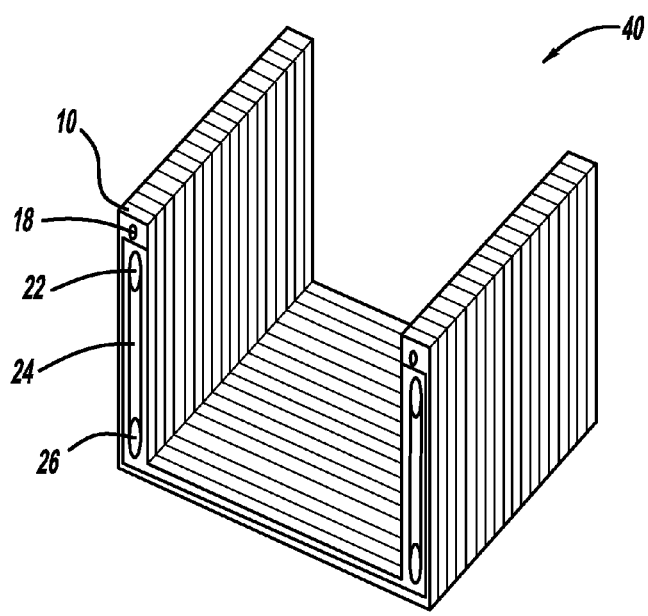
FIG. 5 is a perspective view of the modular assembly showing several U-shaped members stacked together.

FIG. 5 is a perspective view of the modular assembly 40 showing several of the U-shaped members 10 stacked together. For the sake of clarity, the carrier plates 42 are not shown. Any number of U-shaped members 10, carrier plates 42, and pouch cells 60 may be used to create the modular assembly 40. When the U-shaped members 10 are stacked together, the orifices 22 and 26 create a circulation path for the cooling fluid to continuously flow through, which align with the orifices 44 of the carrier plates 42, as discussed above, thereby allowing for the continuous cooling of the pouch cells 60 of the modular assembly housing 40. Liquid coolants are preferred, as liquids are the most effective heat carriers. However, a gaseous coolant may also be used.

The modular assembly 40 would also include a front and back panel (not shown) mounted to the U-shaped members 10 at the ends by the bolts inserted through the holes. Further, a lid (not shown) would be mounted to the top of the side portions 12 and 14 by any suitable means, such as glue. The front and/or back panels would be sealed to the first/last U-shaped member 10 with a sealant, and would typically provide manifolds at the locations of the orifices 22 and 26, which allow cooling fluid from an external hose to enter and exit the assembly 40. The combination of the U-shaped members 10, the front panel, the back panel and the lid would thus define a box in which the battery was housed, where cooling of the battery would be provided by the housing itself.

The U-shaped members 10 are advantageous because they perform several functions, such as mechanical stability and heat transfer. By using low cost plastic elements that are assembled with simple stamped carrier plates 42, the number of parts and seals required are significantly reduced compared to alternative concepts of liquid cooled full area plates and separate plastic housings.

Several modular assembly housings, each with several pouch cells 60, can be electrically coupled together, allowing for a large amount of power while retaining ease of handling and manufacture. In addition, several variations in the die cast design of the U-shaped members 10 can be made without adding additional expense, such as micro-channels or turbulent fins in the cooling fluid channels 24 of the U-shaped members 10 to allow for mixing of the coolant. Other variations that could be incorporated include assembly aids, such as nodules and plate retaining studs for ease of assembly, mounting holes to allow for a lid or cover to be attached, and cooling fluid inlet orifice and outlet orifice guiding fins or other flow features to direct more flow into selected cooling fluid channels. Parts of the U-shaped members 10 can also be hollow to make them lighter, to provide thermal insulation and to allow for crash absorption. Studs or recesses could be provided for lids, PCBs, standoffs, thread extensions, seal aids, and other similar variations.

Figure 6:
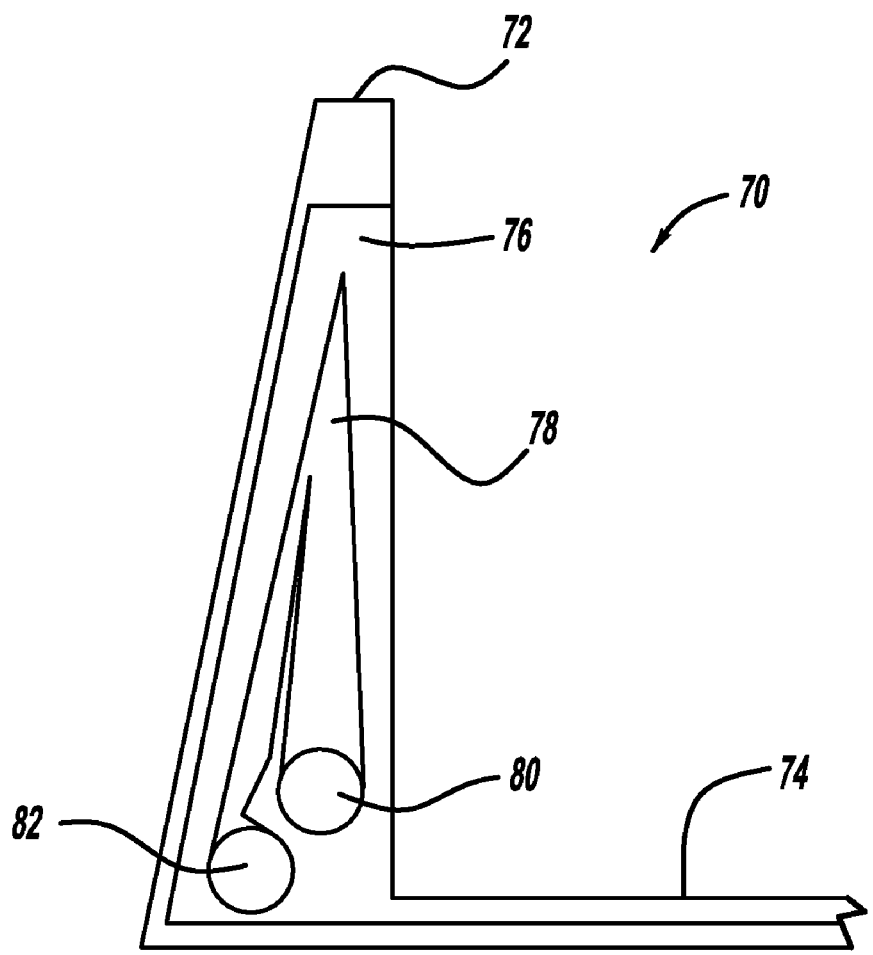
FIG. 6 is a cut-away front-view of a second embodiment of a U-shaped member.

FIG. 6 is a cut-away front view showing an alternative embodiment of a U-shaped member 70 for a modular assembly that houses a battery of the type discussed above. The member 70 includes a side portion 72 and a bottom portion 74 including a retention slot 76. A cooling fluid channel 78 is provided in the retention slot 76. Inlet and outlet orifices 80 and 82 are both positioned near the bottom edge of the U-shaped member 70. The cooling fluid channel 78 is similar to a "V" shape, although a variety of designs for the cooling fluid channel 78 may be used. This design allows for the side portion 72 to be narrower near the top and wider at the bottom.

Similarly, the U-shaped member 70 could be narrow at the top, however, the orifice 80 could still be at the top with an oval-shaped design so as to decrease the width of the orifice 80 and still allow for the cooling fluid channel 78 being essentially straight down the side portion. Alternatively, the U-shaped member 70 could have a cooling fluid channel on the bottom side, along one side, or along both sides, as previously discussed.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A modular assembly for housing battery cells, said assembly comprising:
   a plurality of U-shaped members, each U-shaped member including opposing side portions having a retention slot and a cooling fluid channel with an inlet orifice and an outlet orifice;
   a plurality of thermally conductive carrier plates, each carrier plate including an inlet orifice and an outlet orifice, each carrier plate further being positioned between opposing U-shaped members so that opposite side edges of the carrier plate are positioned within the retention slot in the side portions and the inlet orifice of the cooling fluid channel aligns with the inlet orifice in the carrier plate and the outlet orifice of the cooling fluid channel aligns with the outlet orifice in the carrier plate, wherein a cooling fluid flowing through the assembly flows through the cooling fluid channels in the U-shaped members and through aligned orifices in the U-shaped members; and
   a plurality of battery cells, wherein a separate battery cell is mounted to and between opposing carrier plates.

2. The assembly according to claim 1 wherein the carrier plate is aluminum.

3. The assembly according to claim 1 wherein each battery cell is a lithium pouch battery cell.

4. The assembly according to claim 1 wherein each U-shaped member includes at least one mounting hole where the mounting holes are aligned and the U-shaped members are mounted together by at least one bolt.

5. The assembly according to claim 1 wherein the U-shaped members have a square or rectangular cross-sectional shape.

6. The assembly according to claim 1 wherein each U-shaped member is a single piece molded plastic member.

7. The assembly according to claim 1 wherein each U-shaped member is attached to the carrier plate by an adhesive, by molding to the carrier plate, or a combination thereof.

8. The assembly according to claim 1 wherein the cooling fluid channels include micro-channels, turbulent fins, or a combination thereof, for mixing the cooling fluid.

9. The assembly according to claim 1 wherein each battery cell is mounted to the carrier plate by an adhesive.

10. The assembly according to claim 1 wherein the inlet and outlet orifices in the U-shaped members are located at upper and lower locations of the side portions.

11. A modular assembly for housing battery cells, said assembly comprising:
    a plurality of U-shaped members mounted together in a stacked manner, each U-shaped member including at least one orifice and at least one cooling fluid channel;
    a plurality of thermally conductive carrier plates, each carrier plate including at least one orifice, wherein the carrier plates are mounted between opposing U-shaped members so that orifices in the U-shaped members align with orifices in the carrier plates to allow a cooling fluid to flow through the assembly and cool the carrier plates; and
    a plurality of battery cells where a separate battery cell is mounted between opposing carrier plates.

12. The assembly according to claim 11 wherein the U-shaped members include retention slots that edges of the carrier plates are positioned within.

13. The assembly according to claim 11 wherein the battery cells are lithium pouch battery cell.

14. The assembly according to claim 11 wherein each U-shaped member includes at least one mounting hole where the mounting holes are aligned and the U-shaped members are mounted together by at least one bolt.

15. The assembly according to claim 11 wherein the U-shaped member is attached to the carrier plate by an adhesive, by molding to the carrier plate, or a combination thereof.

16. The assembly according to claim 11 wherein the U-shaped members have a square or rectangular cross-sectional shape.

17. A modular assembly for housing a lithium ion battery, said assembly comprising:
    a plurality of single piece plastic U-shaped members, each U-shaped member including opposing side portions and a bottom portion coupled thereto, each U-shaped member further including a first retention slot formed in the opposing side portions and the bottom portion at a front of the U-shaped member and a second retention slot formed in the opposing side portions and the bottom portion at a back of the U-shaped member, each U-shaped member further including a first cooling fluid channel formed within the first retention slot in one of the opposing side portions at the front of the U-shaped member, a second cooling fluid channel formed within the first retention slot in the other opposing side portion at the front of the U-shaped member, a third cooling fluid channel formed within the second retention slot in the one opposing side portion at the back of the U-shaped member, and a fourth cooling fluid channel formed within the second retention slot in the other opposing side portion at the back of the U-shaped member, wherein first and second orifices extend through the one opposing side portion in fluid communication with the first and third cooling fluid channels and third and fourth orifices extend through the other opposing side portion in fluid communication with the second and fourth cooling fluid channels;
    a plurality of thermally conductive carrier plates, each carrier plate including an inlet orifice and an outlet orifice at both of opposite sides of the carrier plate, each carrier plate further being positioned between opposing U-shaped members so that the opposite side edges of the carrier plate are positioned within the first retention slot of one U-shaped member and the second retention slot of another U-shaped member and the inlet orifice at one side of the carrier plate aligns with the first orifice in the U-shaped members, the outlet orifice at the one side of the carrier plate aligns with the second orifice in the U-shaped members, the inlet orifice at the other side of the carrier plate aligns with the third orifice in the U-shaped members and the outlet orifice at the other side of the carrier plate aligns with the fourth orifice in the U-shaped members, wherein a cooling fluid flowing through the assembly flows through the cooling fluid channels in the U-shaped members and through the aligned orifices in the U-shaped members; and a plurality of pouch battery cells, wherein a separate pouch battery cell is mounted to and between opposing carrier plates.

18. The assembly according to claim 17 wherein the carrier plate is aluminum.

19. The assembly according to claim 17 wherein each U-shaped member includes at least one mounting hole where the mounting holes are aligned and the U-shaped members are mounted together by at least one bolt.

20. The assembly according to claim 17 wherein the U-shaped members have a square or rectangular cross-sectional shape.

* * * * *